Dec. 5, 1944. H. E. GANTZER 2,364,523
STRAIGHT LINE CAPPING MACHINE
Filed March 15, 1941 7 Sheets-Sheet 1

INVENTOR
Howard E. Gantzer
BY
James D. Bock
ATTORNEY

Dec. 5, 1944.   H. E. GANTZER   2,364,523
STRAIGHT LINE CAPPING MACHINE
Filed March 15, 1941   7 Sheets-Sheet 3

INVENTOR
Howard E. Gantzer
BY
James D. Bock
ATTORNEY

Dec. 5, 1944.   H. E. GANTZER   2,364,523
STRAIGHT LINE CAPPING MACHINE
Filed March 15, 1941   7 Sheets-Sheet 4

INVENTOR
Howard E. Gantzer
BY
James D. Bock
ATTORNEY

Dec. 5, 1944.   H. E. GANTZER   2,364,523
STRAIGHT LINE CAPPING MACHINE
Filed March 15, 1941   7 Sheets-Sheet 5

INVENTOR
Howard E. Gantzer
BY
James D. Bock
ATTORNEY

Dec. 5, 1944.  H. E. GANTZER  2,364,523
STRAIGHT LINE CAPPING MACHINE
Filed March 15, 1941  7 Sheets-Sheet 7

INVENTOR
Howard E. Gantzer
BY
James D. Bock
ATTORNEY

Patented Dec. 5, 1944

2,364,523

UNITED STATES PATENT OFFICE 2,364,523

STRAIGHT LINE CAPPING MACHINE

Howard E. Gantzer, Kenmore, N. Y., assignor to Consolidated Packaging Machinery Corporation, Buffalo, N. Y., a corporation of New York Application March 15, 1941, Serial No. 383,522

24 Claims. (Cl. 226—88)

This invention relates to new and useful improvements in capping machinery and particularly seeks to provide a novel straightline capping machine provided with a conveyer adapted to move a plurality of objects in a straightline path of travel and a plurality of capping chucks movable in an orbital path including a major portion on one side coextensive with the path of travel of the conveyer.

In certain prior known forms of capping machinery, the object handling conveyors have been adapted to feed a line of successively presented objects or containers to a rotary turret which moves the containers through an arcuate path of travel to a capping station where a capping chuck was adapted to apply a cap to the container and in which further movement of the turret effected a discharge of the capped container onto some form of discharge conveyer which may or may not have been disposed along the same general path of travel as the initial conveyer. Certain other forms of capping machinery provided an intermittently operable conveyer which was adapted to move a plurality of containers through a straightline path of travel to a position where they were disposed in registry with a capping station of the machine and at which station a capping device was adapted to apply a cap to the container and the container was then moved onto some form of discharge device.

In all of the prior known forms of capping machinery either of the rotary turret type or of the single station straightline type, the over-all productive speed of capping was seriously limited to an undesirably low level due to the very nature of the capping mechanisms which were employed to effect the capping of the containers. This invention overcomes difficulties heretofore encountered in the above mentioned types of capping machines and provides a novel capping machine through the use of which a line of spaced containers may be continuously moved along a conveyer and during a portion of the path of travel of said containers along the conveyer they will be brought into registry with associated capping mechanisms which are moved through an orbital path in perfect synchronization with the travel of the containers and are moved into and out of capping engagement with the respective containers as they are being moved along. Thus, the individual containers to be capped are not brought to a stop or even slowed down through any portion of the path of travel along the conveyer mechanism of the capping machine and an over-all increase of substantial extent in the productive capacity of a capping machine can be effected.

It is, therefore, an object of this invention to provide a capping machine of the straightline type which includes a conveyer adapted to move a plurality of spaced containers at a uniform rate of speed and a plurality of capping chucks adapted to be moved in perfect synchronization with the conveyer-borne containers whereby caps may be applied to the containers as they are being moved by the conveyer.

Another object of this invention is to provide a machine of the character stated in which the capping chucks are moved through an orbital path, the major portion of one side of which is coincident with the path of travel of the conveyer whereby the capping chucks may be engaged with a plurality of containers at any given time during which the containers and chucks are moving in coincident synchronization.

Another object of this invention is to provide a machine of the charatcer stated in which rotation of the capping chucks is effected only during that portion of the orbital path of travel thereof which is coincident with the path of travel of the conveyer.

Another object of this invention is to provide a machine of the character stated in which the entire capping chuck assembly may be moved vertically to provide for vertical adjustment when containers having different heights are to be capped.

Another object of this invention is to provide a machine of the character stated in which the container engaging elements of the conveyers are adjustable in a generally peripheral direction to thereby provide adjustment of the conveyers to permit capping of containers having different longitudinal dimensions.

Another object of this invention is to provide a machine of the character stated which includes a primary conveyer adapted to feed a line of successively presented containers at a relatively rapid rate of speed and a timing device adapted to engage each leading container of the line of containers and effect the spacing of such leading container from the remainder of the line to thereby properly space the containers upon the conveyer for subsequent registry with the capping chucks.

A further object of this invention is to provide a machine of the character stated which is simple in design, rugged in construction and economical to manufacture.

With these and other objects in view, the nature of which will become more apparent, the invention will be more fully understood by reference to the drawings, the accompanying detailed description, and the appended claims.

Referring to the drawings in detail, the invention, as illustrated, is embodied in a capping machine which includes a supporting frame A, a continuously moving conveyer B adapted to receive a line of containers from a filling machine or the like and move the containers in spaced relation through engagement with the capping devices, a timing and spacing mechanism C which regulates the spacing of the containers for engagement by a secondary conveyer D associated with the capping devices and adapted to maintain the spaced relation of the containers during capping operations, and a capping assembly generally indicated at E.

The supporting frame A includes a table top 5 rigidly supported by legs 6 and carries the conveyer B. The conveyer B includes the usual chain supporting channels 7 provided at each end with a sprocket gear 8 which is operatively engaged by an endless sprocket chain 9. It should be noted that both ends of the conveyer B overhang the ends of the table top 5 a considerable distance in order to facilitate coordination and alignment of the conveyer and its associated capping mechanism with the conveyers of other machines with which the capping machine may be associated. The top 5 is provided with dependably mounted brackets 10 which rotatably support a shaft 12. A V-pulley 13 is affixed to the rear end of the shaft 12 and is adapted to be driven through the medium of a belt 14 and V-pulley 15 secured to one end of the shaft of a motor 16 dependably mounted beneath the top 5. The front end of the shaft 12 is provided with a small pinion gear 17 disposed in meshing relation with a spur gear 18 rotatably carried by a bracket 11 dependably mounted on the top 5 adjacent the front thereof. The spur gear 18 is provided with a rearwardly extending bushing 19 to which a sprocket gear 20 is rigidly affixed. A flanged guide pulley 21, which is disposed in the same generally vertical plane as the sprocket 20, is rotatably mounted on one end of an angularly adjustable arm 22, the other end of which is releasably secured to the bracket 11 as by a bolt 23. The sprocket chain 9 is carried over the sprocket 20 and under the adjustably mounted guide pulley 21 the position of which may be varied to regulate the slack in the conveyer chain. It will thus be readily apparent that motion will be imparted to the conveyer chain 9 through the sprocket 20 and its associated driving connections.

The overhanging portions of the conveyer channels 7 are provided with brackets 24 rigidly secured thereto and including spaced upstanding arms 25. The arms 25 of the brackets are adapted to carry guide rails 26 through the medium of inwardly extending stud bolts 27 and wing nuts 28. The guide rails 26 are disposed equidistantly from the center line of the conveyer B and may be adjusted to a greater or less distance from the conveyer center line through the medium of the mounting studs 27 and the wing nuts 28 to thereby provide the adjustment which may be necessary when containers of different size are being moved by the conveyer. The central portion of the conveyer channels 7 are provided with mounting brackets including upstanding arms 29 disposed on the forward side thereof. The arms 29 are adapted to yieldably support a guide rail 30 disposed in substantial alignment with the guide rails 26 through the medium of mounting studs 31 and compression springs 32 interposed between the guide rails and the respective mounting arms 29. The forward ends of the mounting studs are provided with position-adjusting nuts 33 threadably engaged therewith. Thus, it is obvious that the guide rail 30 is constantly urged in a rearward direction towards the axis of the conveyer B and will have its rear surface frictionally engaged by objects being fed through the machine by the conveyer. Any irregularities in thickness of objects being moved by the conveyer will be compensated for by the resilient mounting of the guide rail 30 and misalignment of the containers relative to the axis of the conveyer will be prevented.

As containers F are first received by the conveyer B they are brought into engagement with a timing and spacing mechanism generally indicated at C. This timing mechanism per se forms no part of the present invention but is described in detail in applicant's copending application, Serial No. 285,417, filed July 19, 1939. Generally speaking, the timing mechanism includes a cylinder 34 bearing a helical ribbon 35 adapted to be interposed between two adjacent containers and cause the proper spacing thereof along the conveyer B. The cylinder 34 is adapted to be rotated through the medium of an upper set of bevel gears generally indicated at 36 and a lower set of bevel gears generally indicated at 37 which are operatively driven from the shaft 12 through the medium of sprocket chain and gear connections generally indicated at 38.

Figure 3:
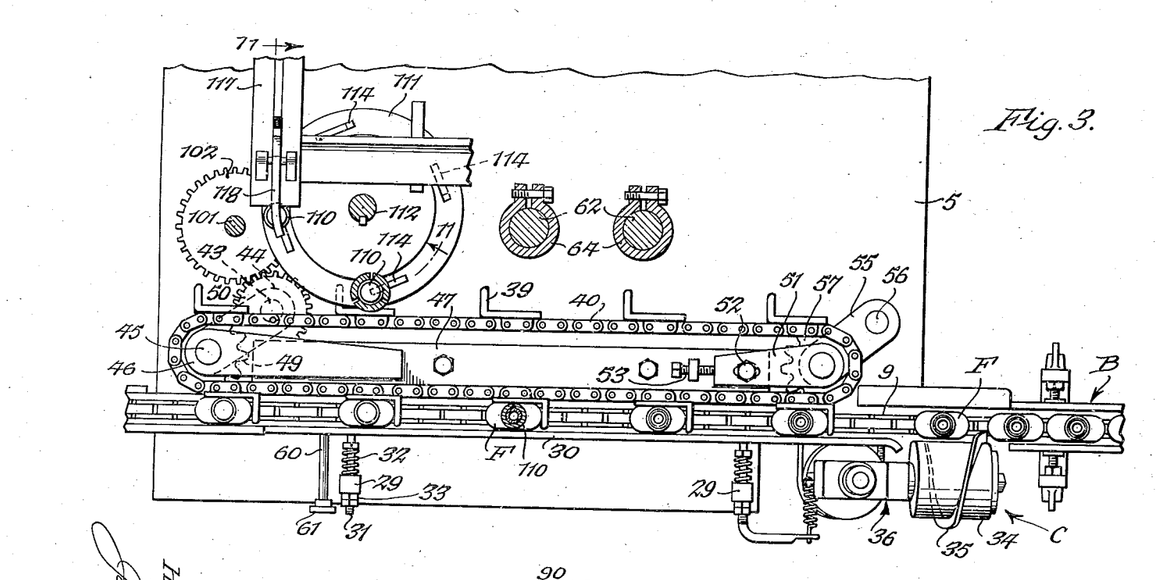
Fig. 3 is a horizontal section taken on line 3—3 of Fig. 1.
Figure 4:
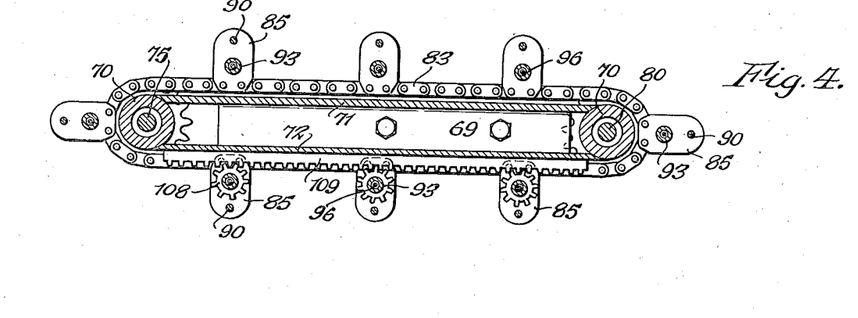
Fig. 4 is a horizontal section taken on line 4—4 of Fig. 1.
Figure 5:
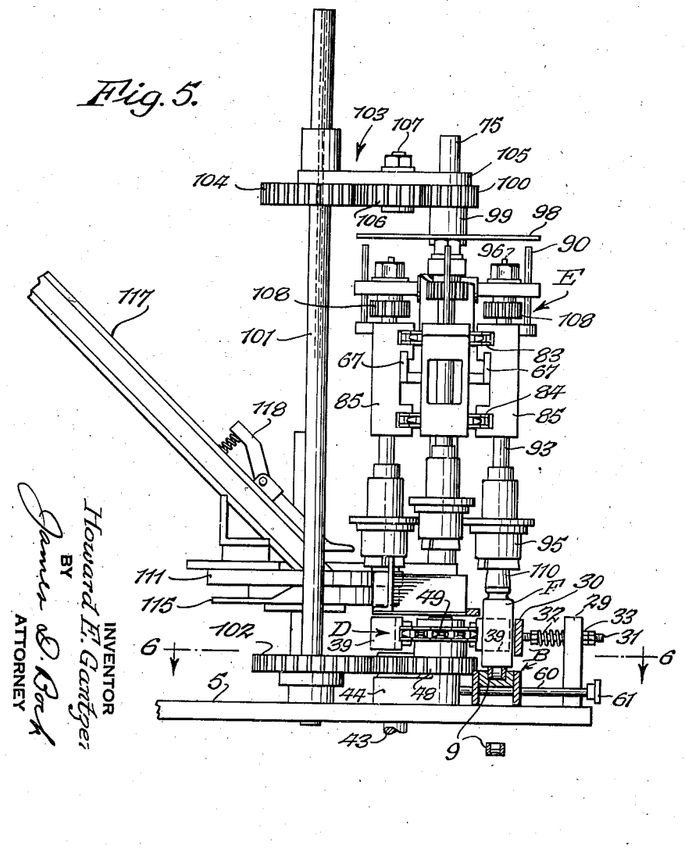
Fig. 5 is a left-end elevation, partly in section, of the entire upper portion of the machine.
Figure 7:
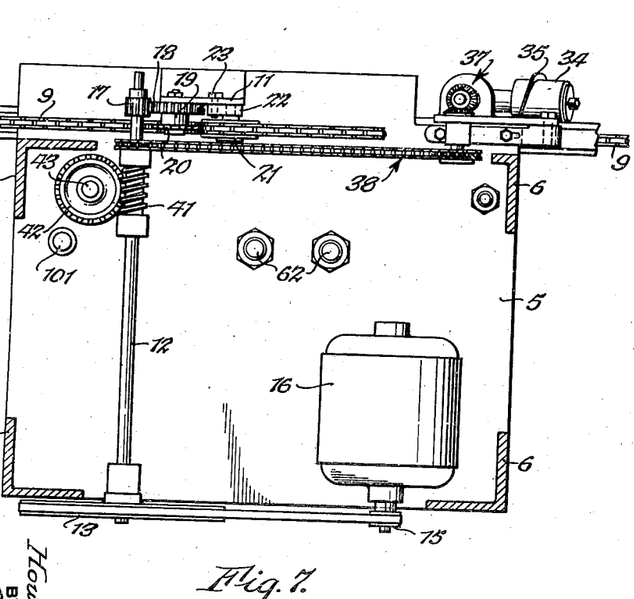
Fig. 7 is a horizontal section taken on line 7—7 of Fig. 1.
Figure 8:
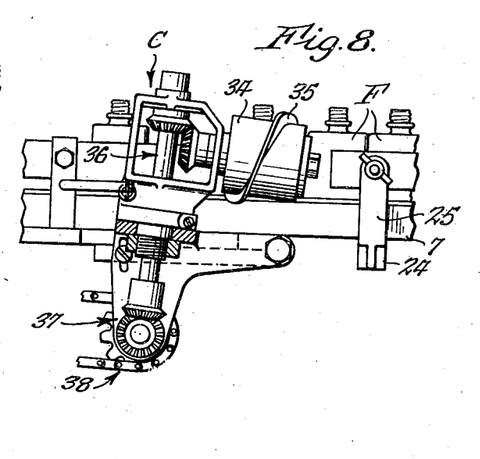
Fig. 8 is a fragmentary front elevation, partly in section, and illustrating the timing and spacing mechanism in detail.
Figure 9:
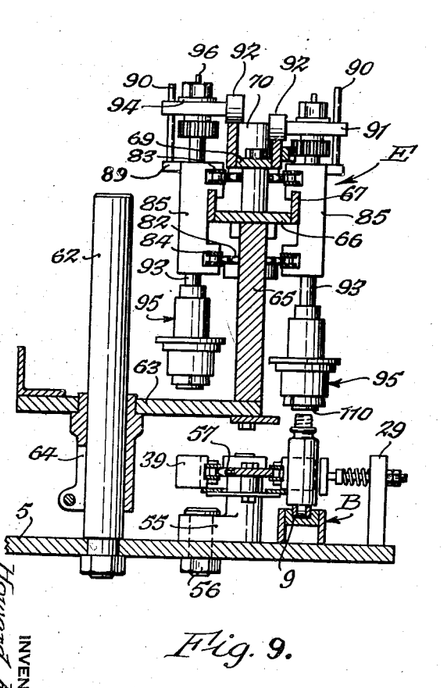
Fig. 9 is a transverse vertical section taken on line 9—9 of Fig. 2.

As the containers F are moved by the conveyer B, after having been properly spaced by the timing and spacing mechanism C, they are brought into engaging relation with pusher elements 39 carried by the secondary conveyer D. The secondary conveyer D includes a sprocket chain 40 to which the pusher elements 39 are affixed. The conveyer chain 40 is mounted and driven through mechanisms (see Figs. 3 and 7) which include a worm 41 rigidly secured to the main drive shaft 12 and disposed in meshing engagement with a worm gear 42 carried by a vertically disposed shaft 43 journalled in the table top 5. One end of an arm 44 is freely mounted on that portion of the shaft 43 which projects above the table top 5. The other end of the arm 44 is engaged with the lower end of a stub shaft 45 rotatably carried thereby. The upper end of the shaft 45 is journalled in the end of a spacer arm 46 rigidly secured to a spacer bar 47. A spur gear 48 is rigidly secured to the shaft 45 adjacent the arm 44 and a sprocket gear 49, engageable with the chain 40, is releasably secured to the shaft 45 adjacent the spacer arm 46. The spur gear 48 meshes with a similar spur gear 50 rigidly affixed to the shaft 43 to thereby transmit power from the main drive shaft 12 to the sprocket gear 49. The other end of the spacer bar 47 is provided with a longitudinally adjustable spacer arm 51 secured to the bar 47 by a bolt 52 and is adjustable through the medium of a set screw assembly 53. The outer end of the spacer arm 51 is rotatably engaged with the upper end of a stub shaft 54, the lower end of which is rotatably carried by the free end of an arm 55 similar to the arm 44 and pivotally secured to the table top 5 as at 56. A sprocket gear 57 is releasably secured to the shaft 54 intermediate to the spacer arm 51 and the arm 55 and engages the sprocket chain 40. It will be apparent that the sprocket gears 49 and 57 are maintained in spaced relation by the spacer bar 47 and its associated spacer arms.

Figure 6:
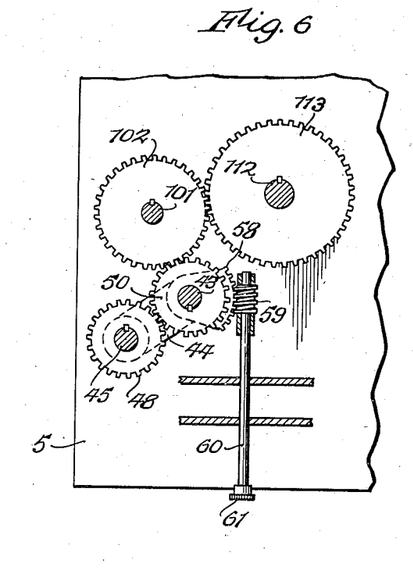
Fig. 6 is a horizontal section taken on line 6—6 of Fig. 5.

The secondary conveyer chain 40 and its associated sprocket gears and driving mechanism may be bodily moved towards and away from the main conveyer B to provide greater or less spacing of the pusher elements 39 from the main conveyer axis in accordance with the lateral dimensions of various sized containers being capped. To this end, the arm 44 is provided with an offset gear sector 58 rigidly secured thereto (see Fig. 6) and engageable with a worm 59 carried by a shaft 60. The shaft 60 is journalled in the conveyer channels 7 and then provided at its forward end with a hand wheel 61. The rotation of the shaft 60 will effect the rotative movement of the gear sector 58 and the arm 44, which thereby varies the axis position of the stub shaft 45. Since the stub shaft 45 and the stub shaft 54 are maintained in spaced relation by the spacer bar 47 and its associated spacer arms, shifting of the axis of the shaft 45 will effect a corresponding shifting of the axis of the stub shaft 54 while at the same time continuing to maintain the parallel relationship between the longitudinal axes of the main and secondary conveyers. It should be noted that the speed of the secondary conveyer D may be equal to but should never be greater than the speed of the main conveyer B in order that the pusher elements 39 may be constantly positioned against the containers associated therewith during capping operations to thereby assure proper registry of the containers with the capping chucks.

The capping assembly E consists of a plurality of spaced capping chucks movable through a generally horizontal orbital path including a straight line portion which overlies and coincides with the axis of the main conveyer B. As the capping chucks move into the straight line portion of the orbital path of travel they will be brought into alignment with the axis of the conveyer B and will then be successively lowered vertically while still moving horizontally to become thereby placed into capping engagement with a container which is supported by the conveyer B and maintained in proper registry with the pusher elements of the secondary conveyer D. Each successively lowered chuck is then raised and disengaged from the associated container to thereby permit the capped container to be discharged by the conveyer B and to permit travel of the chuck around the remaining portion of its orbital path preparatory to its engagement with a later presented container.

The devices by which the actual capping operations are effected, as described, include a pair of spaced vertical standards 62—62 rigidly secured to the table top 5. A platform 63 (see Fig. 10) is carried by the standards 62 and is mounted thereon through the medium of vertically adjustable clamp sleeves 64. The forward edge of the platform 63 is provided with an upstanding plate 65 rigidly secured thereto and adapted to support the chuck. A relatively long and narrow rectangular plate 66 is horizontally positioned atop the plate 65 and is rigidly secured thereto with its median axis lying within the median plane of the vertical plate 65. Upstanding flange plates 67 having lengths shorter than the length of the plate 66 are rigidly secured to the longitudinal edges of the plate 66 and serve to maintain the capping chucks in proper vertical alignment during passage thereof along the straight portions of the orbital path of travel, as will be hereinafter more fully described. Spaced standards 68 are secured to the plate 66 and rigidly support any suitable form of orbital contour cam. In the particular embodiment illustrated, the orbital cam comprises a bottom plate 69 provided at its ends with opposed upstanding sleeves 70 secured thereto and defining end wall portions. The rear portions of the sleeves 70 are joined by a cam plate 71 having a substantially straight upper edge over the major portion of its length and the front portions of the sleeves 70 are joined by a cam plate 72 having its upper edge portions properly contoured to provide the desired vertical movement to the capping chucks for engagement with and disengagement from the containers.

One end of the horizontal plate 66 is provided with a downwardly extending boss 73 having a bushing 74 mounted therein. A vertically disposed shaft 75 is journalled in the bushing 74 and has its lower end projecting therebelow. A pair of upper and lower sprocket gears 76 and 77 respectively are releasably secured to the shaft 75 and are respectively disposed above and below the boss 73 to thereby prevent disengagement of the shaft from the bushing and to accurately space the sprockets. The upper end of the shaft 75 extends through a bushing 78 fitted in the corresponding sleeve 70 of the contour cam. The other end of the plate 66 is provided with a vertically disposed sleeve bearing 79 extending above and below the plate. A shaft 80 is journalled within the bearing 79 and is provided at its ends with a pair of upper and lower sprocket gears 81 and 82 respectively which correspond in size and spacing to the previously mentioned sprocket gears 76 and 77 and a sprocket chain 83 is carried by the upper sprocket gears 76 and 81 and a similar sprocket chain 84 is carried by the lower sprocket gears 77 and 82. A plurality of vertically disposed generally C-shaped spindle carrying blocks 85 are equidistantly spaced around and secured to the sprocket chains 83 and 84 and extend there-between. In the particular embodiment of the invention described herein, there are illustrated eight of the mounting blocks 85 for carrying a like number of chuck spindles. However, the number employed may be varied to suit operating conditions that may be met in any particular machine installation. Thus, some installations may require as many as ten capping chucks while others may require as few as four or even less. Regardless of the exact number of mounting blocks and associated spindles that are employed, it is desirable that they be spaced equidistantly around the periphery of the chains 83 and 84 in order that the functions of the machine as a whole may be properly timed and coordinated.

Each mounting block 85 is provided with a rear plane surface 86 adapted to slidably contact the outer surfaces of the flanges 67, and a downwardly extending shoulder 87 spaced rearwardly from the face 86 to define a channel or groove 88 adapted to engage the upper edges of the flanges 67. Thus, each mounting block is carried by the sprocket chains 83 and 84 and as any one block approaches a straight portion of its orbital path of travel the shoulder 87 engages the upper edge portion of a flange 67 and the face 86 slidably rests against the opposed face of the flange to thereby prevent the block from becoming displaced out of proper vertical alignment. Each mounting block 85 is provided with an outwardly extending lug 89 located adjacent the top thereof and which carries an upstanding stud 90. A spindle mounting bar 91 has one end slidably carried by the stud 90. The other end of the bar 91 is provided with a roller cam follower 92 engageable with the upper edge or contour portion of the orbital cam. A vertically disposed hollow spindle 93 is slidably and rotatably mounted in each block 85 and has its upper end extending through a suitable bushing in the associated mounting bar 91. The upper end of the spindle is provided with a removable shoulder element 94 which prevents the spindle from becoming disengaged from the mounting bar 91 and the block 85. The lower end of the spindle may be provided with any suitable type of capping chuck 95 but a chuck similar to that disclosed in U. S. Letters Patent No. 2,076,631, granted on April 13, 1937, to this inventor, may be employed advantageously. Each spindle 93 is provided with an interiorly disposed knock-out rod 96 constantly urged upwardly as by a spring 97. The upper end of the rod 96 normally projects slightly above the end of the spindle and is engageable with an abutment plate 98 carried by the downwardly extending hub 99 of a spur gear 100 affixed to the shaft 75.

The sprocket chains 83 and 84, together with the associated mounting blocks and spindles, are adapted to be driven through mechanisms which include a vertically disposed shaft 101 having its lower end journalled in the table top 5 at a position relatively near the shaft 43. A spur gear 102 is secured to the shaft 101 adjacent the lower end thereof and meshes with the gear 50 carried by the shaft 43. A gear train, generally indicated at 103, operatively connects the shaft 100 with the shaft 75 of the capping assembly and includes a spur gear 104 which is spline connected to the shaft 101. A cross bar 105 has one end rotatably carried by the shaft 101 and its other end rotatably carried by the shaft 75. The bar 105 is located above the plane of the top of the gear 100 in order that the gear 100 may effectively support the associated end of the bar. The other end of the bar 105 is similarly supported by the gear 104. An idler gear 106 is dependably and rotatably mounted by a pivot shaft 107 on the bar 105 intermediate its ends and operatively connects the spur gears 100 and 104.

As the capping chucks are moved along the orbital path of travel through the medium of the above described driving connections, successive chucks approach the straight portion of travel, the path of which overlies the axis of the main conveyer B. The individual cam followers 92 ride down the inclined portion of the cam plate 72 to effect the lowering of its associated spindle and chuck into capping engagement with a container F maintained in registry therewith by the secondary conveyer D. Rotative movement is imparted to each chuck 95 as it approaches engagement with the container F by engagement of a pinion 108 rigidly mounted on the spindle 93 with a horizontally disposed rack 109 rigidly secured to the forward face of the cam plate 72. At the time the pinion 108 has become fully meshed with the rack 109, the cam follower 92 and its associated parts have reached the lower limit of vertical movement as defined by the contour of the cam plate 72. Continued movement of the chuck along the straight portion of its orbital path will correspondingly effect continued rotation of the chuck. As the end of this straight portion of travel is reached, the cam follower 92 engages the upwardly inclined portion of the cam plate 72 to raise the chuck out of engagement with the container and to disengage the pinion 108 of its associated spindle from the rack whereby positive rotative movement of the spindle will stop. It should be noted that the upper corners of those teeth of the rack 109 which are first engaged by the pinion 108 may be bevelled in order to facilitate a smooth engagement between the rack and the pinion.

Figure 1:
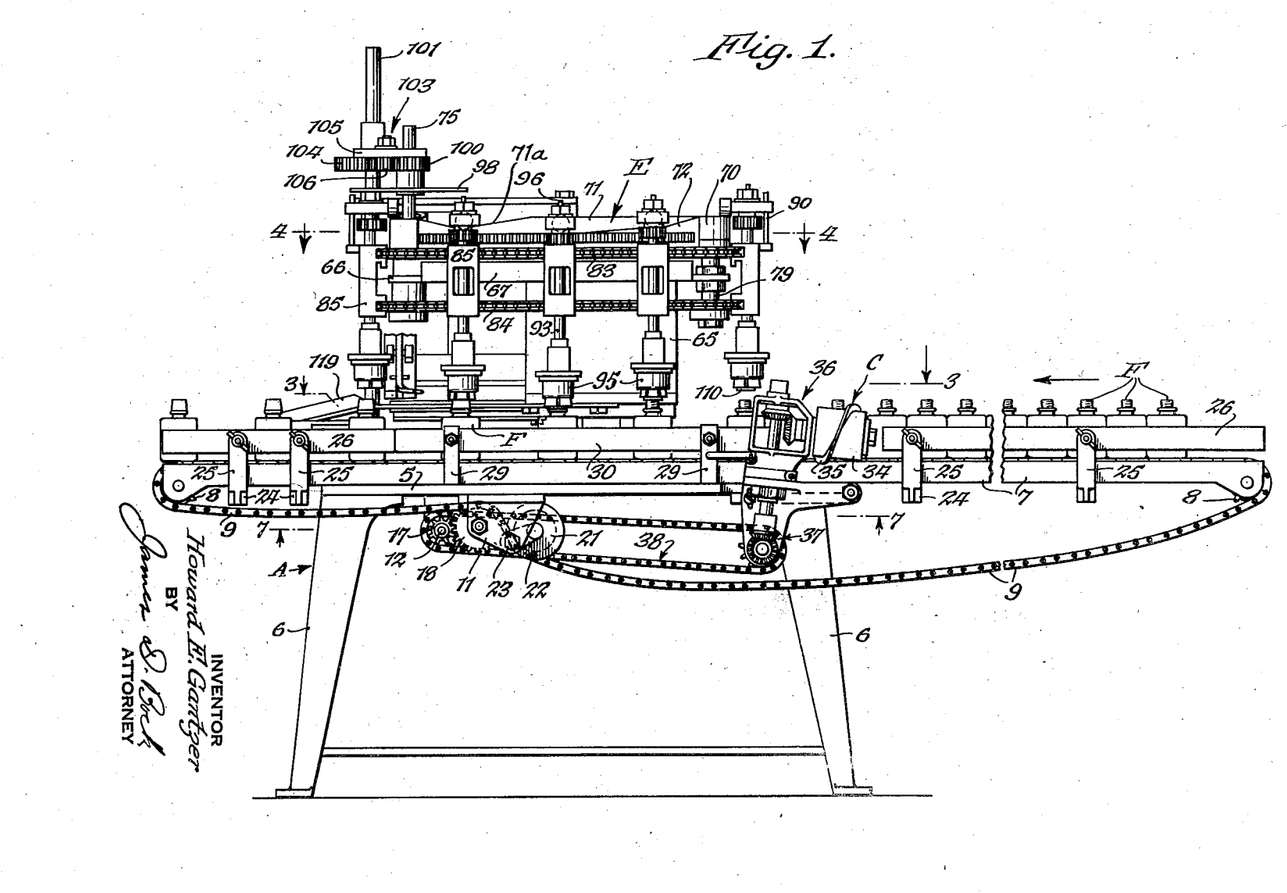
Fig. 1 is a front elevation of a capping machine constructed in accordance with this invention.
Figure 2:
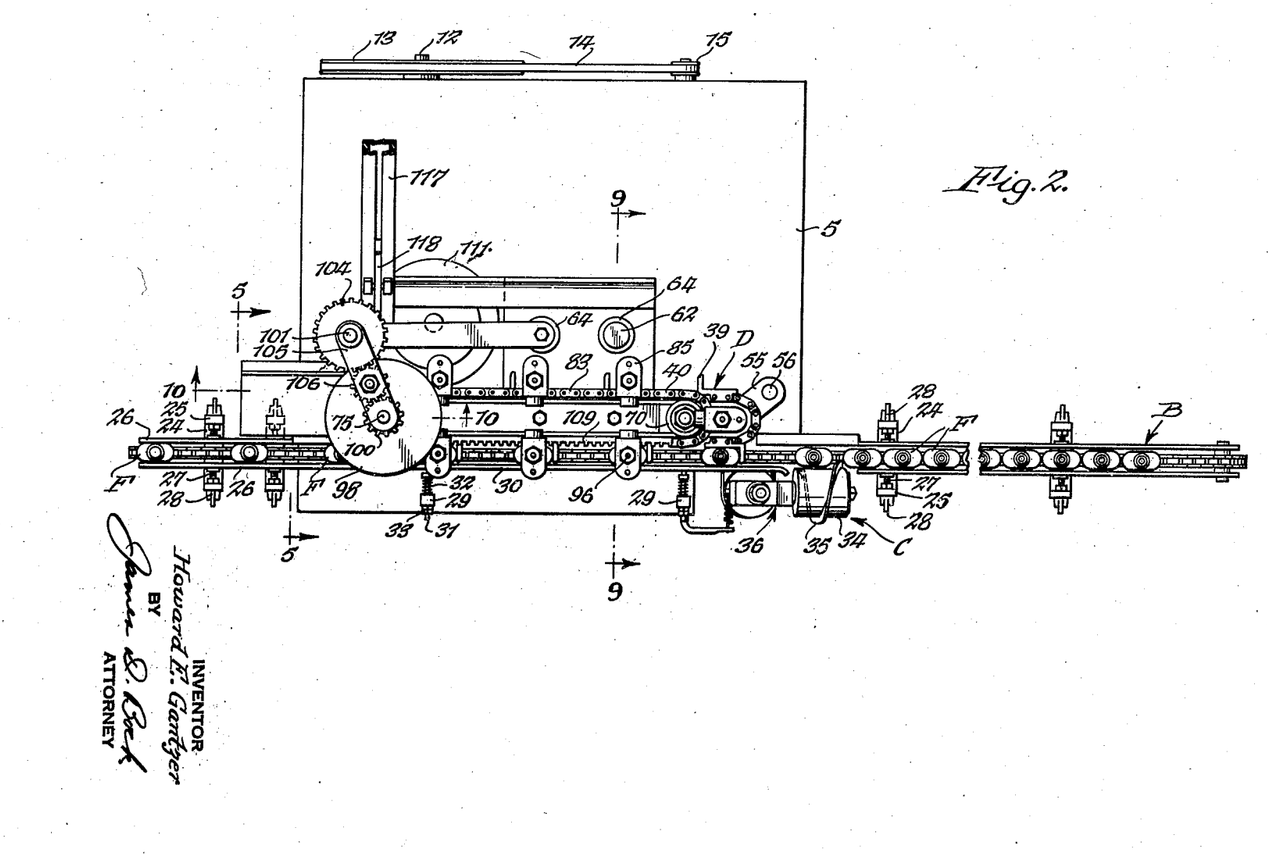
Fig. 2 is a top plan view thereof.
Figure 10:
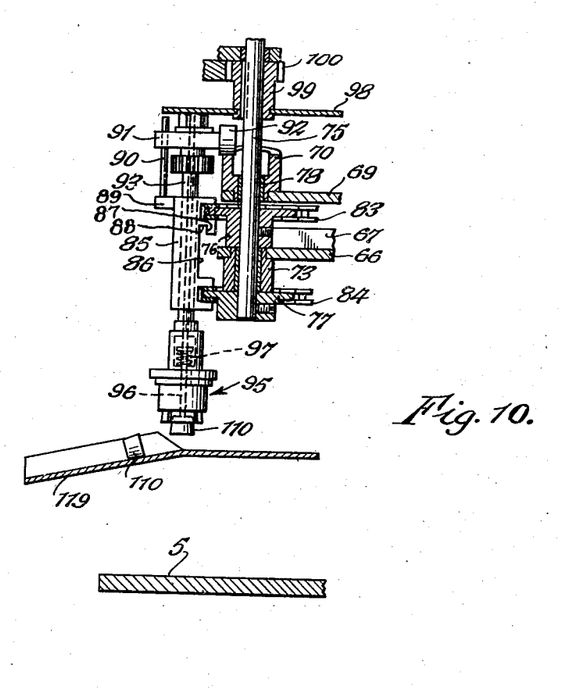
Fig. 10 is a longitudinal vertical section taken on line 10—10 of Fig. 2.
Figure 11:
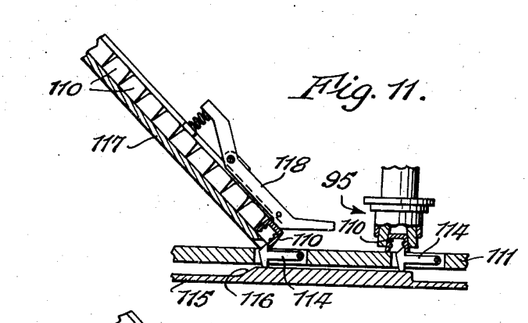
Fig. 11 is a vertical section taken on line 11—11 of Fig. 3 and showing the engagement of a cap by the picker element and the engagement of a cap by a chuck.
Figure 12:
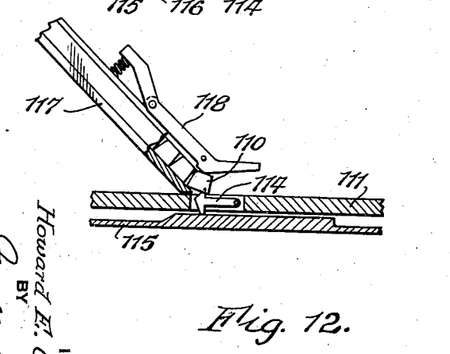
Fig. 12 is a view generally similar to that illustrated in Fig. 11 which shows a further stage of removal of a cap from the supply chute.

Each chuck 95, on the back portion of its orbital path of travel, is adapted to pick up a container cap 110 from cap supplying devices similar to those disclosed in the inventor's copending application, Serial No. 285,418, filed July 19, 1939 (see Figs. 5, 6, 11 and 12), and which include a picker disk 111 rigidly secured to a vertically disposed shaft 112 journalled in the table top 5. The shaft 112 is adapted to be driven from the shaft 43 through the medium of a spur gear 113 which meshes with the gear 102 carried by the shaft 101 (see Fig. 6). The picker disk 111 is provided with a plurality of equally spaced picker elements 114 pivotally mounted in circumferentially disposed slots located near the periphery of the disk. A table 115 is stationarily mounted beneath the disk 111 and is adapted to slidably support the ends of the pickers 114 during rotation of the disk 111. The table 115 is provided with an upwardly projecting cam portion 116 over which the ends of the pickers are adapted to ride and which effects an upward projection of the picker ends above the top plane of the disk 111 preparatory to engagement with a container cap. A cap supply chute 117 is associated with the disk 111 and has its lower end disposed approximately over the leading edge of the table cam 116. The caps 110 are retained in the chute by a spring biased detent 118, the lower end of which is displaceable to permit a cap to be withdrawn by a picker element as is clearly shown in Fig. 13 of the drawings. By referring to Fig. 3 of the drawings, it will be seen that the path of travel of the picker elements 114 merges with the path of travel of the chucks 95 for a short distance. During the interval of time in which the chucks and the pickers are thus moving together, the chuck is lowered into engagement with a cap 110 carried by the disk 111 and is then raised to remove the cap from the disk prior to the time at which the respective paths of travel of the chuck and the picker elements again diverge. The raising and lowering of the chuck during this portion of its orbital path of travel is effected through the medium of a shallow depressed portion 71a formed on the rear cam plate 71 (see Fig. 1). Continued movement of the chuck around its orbital path of travel will cause the cap held thereby to be applied to a container in the manner heretofore described. In the event that the container cap should be improperly aligned with respect to the neck of its associated container and thereby fail to become applied to the container, it will be disengaged from the cap at the time the chuck approaches the end of its first straight portion of travel by the engagement of the knock-out rod 96 with the abutment disk 98. The contact between the knock-out rod and the abutment disk effectively delivers a sharp downward blow to the knock-out rod and causes the ejection of the cap onto a discharge chute 119 as is indicated in Fig. 10 of the drawings.

When it is found desirable to cap containers having different dimensions from those for which the machine had been originally set, the various operative parts of the machine may be readily adjusted to conform with the different dimensions of the new series of containers. Thus, if the thickness of the new containers is greater in a front to rear direction, the guide rails 26 are spaced farther apart and the spring biased guide rail 30 is moved forwardly by the proper readjustment of the stop nuts 33. The secondary conveyer D is moved rearwardly through the medium of the hand wheel 61 in order that the pusher elements carried thereby may be properly positioned on the back side of the new series of containers. If the new series of containers also present a greater or lesser dimension parallel to the axis of the main conveyer B, the pusher elements 39 are shifted relative to the axis of the capping spindles 93 in order that the neck of the container may be maintained in proper registry therewith. This is effected by merely releasing the engagement of the sprockets 49 and 57 from their respective mounting shafts and then rotating the sprockets relative to the shafts to thereby effect the proper relative movement of the pushers with respect to the axes of the spindles and then again securing the sprockets in the newly adjusted position. Vertical adjustment of the capping assembly E may be simply effected by releasing the clamping sleeves 64 and then raising or lowering the entire assembly to conform with the height of the new series of containers. When the capping assembly is raised or lowered in this manner, the gear train 103 will also be raised or lowered and relative sliding movement will be effected between the spur gear 104 and the splined shaft 101 thereby maintaining a continuity of effective driving connections.

Figure 13:
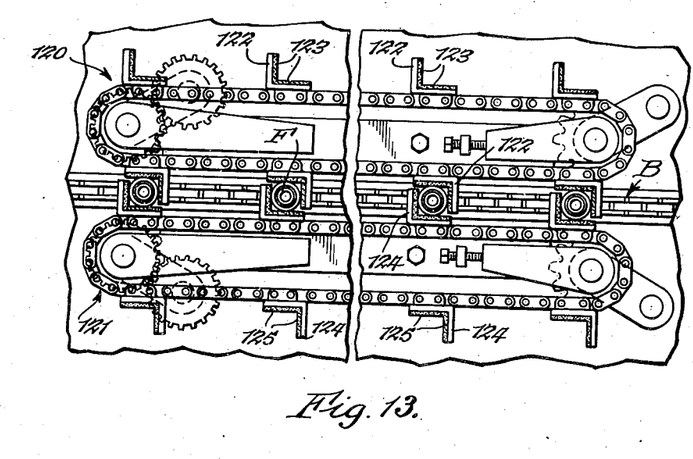
Fig. 13 is a fragmentary top plan view of a modified form of the container engaging conveyer.

The pusher elements 39 are particularly adapted for all forms of containers which are generally rectangular in nature or which at least include two parallel side walls. However, should it become desirable to employ a machine of this nature in connection with the capping of cylindrical containers, the secondary conveyer must be modified in order to provide a clamping action on such round containers whereby to prevent rotation of the containers relative to the pusher elements. In Fig. 13 of the drawings, there is illustrated a modified form of secondary conveyer which is designed for particular use in conjunction with generally cylindrical containers. This modified conveyer comprises a pair of spaced symmetrically opposed units 120 and 121, each of which is constructed similarly to the secondary conveyer D. The sprocket chains of the unit 120 are provided with a plurality of equally spaced pusher elements 122 having their container engaging faces provided with resilient pads 123 which may be formed from rubber, felt, soft leather, or other suitable material. The unit 121 is provided with a similar set of elements 124 and pads 125, but which are turned in a direction opposing that of the pusher elements 122 to define thereby generally square wells adapted to receive containers F, and in which the resilient pads 123 and 125 frictionally engage the containers associated therewith to restrain the same against rotation. It should be obvious that when cylindrical containers having different diameters are to be capped, the units 120 and 121 will be moved toward or away from each other to conform laterally to the new container size, and the pusher elements 122 and 123 will be adjusted relatively to conform to the new container size axially with respect to the main conveyer.

It has been found that capping machines constructed in accordance with this invention have a greatly increased rate of production in comparison with capping machines of prior known types. For example, a machine of the nature herein disclosed has been found capable of handling containers at a rate of approximately four hundred containers per minute, and it is believed that efficient capping can be produced at speeds in excess of 225 containers per minute. Further, by a simple change in design without affecting the functions of the various parts whatsoever, a capping machine of this nature may be readily adapted to apply caps to two oppositely moving lines of containers located on opposite sides of the machine.

Thus, it will be seen that the herein described invention provides a novel straight line capping machine particularly adapted to apply threaded caps to continuously moving containers; which includes a plurality of capping chucks movable in an orbital path having a straight portion overlying and coinciding with the path of travel of the containers, which are adapted to be progressively and successively moved into and out of capping engagement with the containers associated therewith, and which are adapted to be rotated during at least the time they are maintained in capping engagement with the containers; which is adjustable on all three dimensional axes to permit capping operations to be performed on containers having a wide range of sizes; and which is simple in design, rugged in construction, and economical to manufacture.

It is of course to be understood that certain details of arrangement and proportions of parts may be variously modified without exceeding the scope of the appended claims.

I claim:

1. In a capping machine, a supporting frame, a continuously moving primary conveyer mounted on said frame and adapted to receive a line of containers successively presented thereto, means associated with said conveyer for successively spacing the containers carried thereby, a secondary straight line conveyer associated with said primary conveyer for accurately maintaining said containers in said spaced relation thereon, means for laterally adjusting said secondary conveyer with respect to said primary conveyer, a capping assembly carried by said frame and including a plurality of capping chucks movable through an orbital path including a straight portion overlying the path of travel of said containers, means for moving said chucks in synchronism with said secondary conveyer and the associated containers, means associated with said capping assembly for supplying container caps to said chucks, means for moving the cap carrying chucks into and out of capping engagement with said containers, means including rack and pinion connections for effecting the rotation of each chuck during at least the time each said chuck is maintained in capping engagement with an associated container, means for vertically adjusting said capping assembly with respect to said straight line conveyer, and means for ejecting from said chucks any caps that were not applied to containers.

2. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path at a speed of advance equal to the speed of advance of said containers, means for moving said chucks into and out of capping engagement with said containers, and means for operating each of said chucks while in capping engagement with said containers to secure caps to said containers.

3. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path at a speed of advance equal to the speed of advance of said containers, means for moving said chucks into and out of capping engagement with said containers, and means for rotating said chucks during at least the time they are maintained in capping engagement with said containers.

4. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path at a speed of advance equal to the speed of advance of said containers, means for supplying container caps to said chucks, means for moving said cap carrying chucks into and out of capping engagement with said containers, and means for operating each of said chucks while in capping engagement with said containers to secure caps to said containers.

5. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path at a speed of advance equal to the speed of advance of said containers, means for supplying container caps to said chucks, means for moving said cap carrying chucks into and out of capping engagement with said containers, and means for rotating said chucks during at least the time they are maintained in capping engagement with said containers.

6. In a straight line capping machine, a constantly moving straight line conveyer adapted to receive a line of containers to be capped, means associated with said conveyer for accurately spacing on said conveyer containers successively presented thereto, a plurality of capping chucks successively movable through a single orbital path including a straight portion overlying the path of travel of said containers, means for moving said chucks successively through said straight portion of said orbital path, means for moving said chucks into and out of capping engagement with said containers, and means for operating each of said chucks while in capping engagement with said containers to secure caps to said containers.

7. In a straight line capping machine, a constantly moving straight line conveyer adapted to receive a line of containers to be capped, means associated with said conveyer for accurately spacing on said conveyer containers successively presented thereto, a plurality of capping chucks successively movable through a single orbital path including a straight portion overlying the path of travel of said containers, means for moving said chucks successively through said straight portion of said orbital path, means for moving said chucks into and out of capping engagement with said containers, and means for rotating said chucks during at least the time they are maintained in capping engagement with said containers.

8. In a straight line capping machine, a constantly moving straight line conveyer adapted to receive a line of containers to be capped, means associated with said conveyer for accurately spacing on said conveyer containers successively presented thereto, a plurality of capping chucks successively movable through a single orbital path including a straight portion overlying the path of travel of said containers, means for moving said chucks successively through said straight portion of said orbital path, means for supplying container caps to said chucks, means for moving said cap carrying chucks into and out of capping engagement with said containers, and means for operating each of said chucks while in capping engagement with said containers to secure caps to said containers.

9. In a straight line capping machine, a constantly moving straight line conveyer adapted to receive a line of containers to be capped, means associated with said conveyer for accurately spacing on said conveyer containers successively presented thereto, a plurality of capping chucks successively movable through a single orbital path including a straight portion overlying the path of travel of said containers, means for moving said chucks successively through said straight portion of said orbital path, means for supplying container caps to said chucks, means for moving said cap carrying chucks into and out of capping engagement with said containers, and means for rotating said chucks during at least the time they are maintained in capping engagement with said containers.

10. In a straight line capping machine, a constantly moving primary conveyer adapted to receive a line of containers successively presented thereto, means associated with said primary conveyer for spacing said containers, a secondary straight line conveyer associated with said primary conveyer and adapted to accurately maintain the spacing of said containers, a plurality of capping chucks successively movable through a single orbital path including a straight portion overlying the path of travel of said containers upon said secondary conveyer, means for moving said chucks successively through said straight portion of said orbital path in synchronism with said secondary conveyer and the containers associated therewith, and means for moving said chucks into and out of capping engagement with said containers.

11. In a straight line capping machine, a constantly moving primary conveyer adapted to receive a line of containers successively presented thereto, means associated with said primary conveyer for spacing said containers, a secondary straight line conveyer associated with said primary conveyer and adapted to accurately maintain the spacing of said containers, a plurality of capping chucks successively movable through a single orbital path including a straight portion overlying the path of travel of said containers upon said secondary conveyer, means for moving said chucks successively through said straight portion of said orbital path in synchronism with said secondary conveyer and the containers associated therewith, means for moving said chucks into and out of capping engagement with said containers, and means for rotating said chucks during at least the time they are maintained in capping engagement with said containers.

12. In a straight line capping machine, a constantly moving primary conveyer adapted to receive a line of containers successively presented thereto, means associated with said primary conveyer for spacing said containers, a secondary straight line conveyer associated with said primary conveyer and adapted to accurately maintain the spacing of said containers, a plurality of capping chucks movable through a single orbital path including a straight portion overlying the path of travel of said containers on said secondary conveyer, means for moving said chucks successively through said straight portion of said orbital path in synchronism with said secondary conveyer and the containers associated therewith, means for supplying container caps to said chucks, and means for moving said cap carrying chucks into and out of capping engagement with said containers.

13. In a straight line capping machine, a constantly moving primary conveyer adapted to receive a line of containers successively presented thereto, means associated with said primary conveyer for spacing said containers, a secondary straight line conveyer associated with said primary conveyer and adapted to accurately maintain the spacing of said containers, a plurality of capping chucks movable through a single orbital path including a straight portion overlying the path of travel of said containers upon said secondary conveyer, means for moving said chucks successively through said straight portion of said orbital path in synchronism with said secondary conveyer and the containers associated therewith, means for supplying container caps to said chucks, means for moving said cap carrying chucks into and out of capping engagement with said containers, and means for rotating said chucks during at least the time they are maintained in capping engagement with said containers.

14. In a capping machine, a supporting frame, a continuously moving straight line conveyer mounted on said frame and adapted to receive a line of containers successively presented thereto, a capping assembly mounted on said frame for vertical adjustment with respect to said conveyer, said capping assembly including a plurality of capping chucks successively movable through a single orbital path including a straight portion overlying the path of travel of said containers, means for moving said chucks successively through said straight portion of said orbital path, means for moving said chucks into and out of capping engagement with said containers, and means for rotating said chucks during at least the time they are maintained in capping engagement with said chucks.

15. In a capping machine, a supporting frame, a continuously moving primary conveyer mounted on said frame and adapted to receive a line of containers successively presented thereto, a secondary straight line conveyer carried by said frame for lateral adjustment with respect to said primary conveyer and being effective to maintain said containers in accurately spaced relation, a capping assembly carried by said frame and including a plurality of capping chucks successively movable through a single orbital path including a straight portion overlying the path of travel of said containers upon said secondary conveyer, means for moving said chucks successively through said straight portion of said orbital path, means for moving said chucks into and out of capping engagement with said containers, and means for rotating said chucks during at least the time they are maintained in capping engagement with said chucks.

16. In a capping machine, a supporting frame, a continuously moving primary conveyer mounted on said frame and adapted to receive a line of containers successively presented thereto, means associated with said conveyer for successively spacing the containers carried thereby, a secondary straight line conveyer associated with said primary conveyer for accurately maintaining said containers in said spaced relation thereon, means for laterally adjusting said secondary conveyer with respect to said primary conveyer, a capping assembly carried by said frame and including a plurality of capping chucks successively movable through a single orbital path including a straight portion overlying the path of travel of said containers upon said secondary conveyer, means for moving said chucks successively through said straight portion of said orbital path in synchronism with said secondary conveyer and the associated containers, means associated with said capping assembly for supplying container caps to said chucks, means for moving the cap carrying chucks into and out of capping engagement with said containers, and means for vertically adjusting said capping assembly with respect to said straight line conveyer.

17. In a capping machine, a supporting frame, a continuously moving primary conveyer mounted on said frame and adapted to receive a line of containers successively presented thereto, means associated with said conveyer for successively spacing the containers carried thereby, a secondary straight line conveyer associated with said primary conveyer for accurately maintaining said containers in said spaced relation thereon, means for laterally adjusting said secondary conveyer with respect to said primary conveyer, a capping assembly carried by said frame and including a plurality of capping chucks successively movable through a single orbital path including a straight portion overlying the path of travel of said containers upon said secondary conveyer, means for moving said chucks successively through said straight portion of said orbital path in synchronism with said secondary conveyer and the associated containers, means associated with said capping assembly for supplying container caps to said chucks, means for moving the cap carrying chucks into and out of capping engagement with said containers, means for rotating each chuck during at least the time it is maintained in capping engagement with an associated container, and means for vertically adjusting said capping assembly with respect to said straight line conveyer.

18. In a capping machine, a supporting frame, a continuously moving primary conveyer mounted on said frame and adapted to receive a line of containers successively presented thereto, means associated with said conveyer for successively spacing the containers carried thereby, a secondary straight line conveyer associated with said primary conveyer for accurately maintaining said containers in said spaced relation thereon, means for laterally adjusting said secondary conveyer with respect to said primary conveyer, a capping assembly carried by said frame and including a plurality of capping chucks successively movable through a single orbital path including a straight portion overlying the path of travel of said containers upon said secondary conveyer, means for moving said chucks successively through said straight portion of said orbital path in synchronism with said secondary conveyer and the associated containers, means associated with said capping assembly for supplying container caps to said chucks, means for moving the cap carrying chucks into and out of capping engagement with said containers, means including rack and pinion connections for effecting the rotation of each chuck during at least the time each said chuck is maintained in capping engagement with an associated container, and means for vertically adjusting said capping assembly with respect to said straight line conveyer.

19. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path in synchronism with said containers, means for supplying container caps to said chucks, means for moving said chucks into and out of capping engagement with said containers, means for operating each of said chucks while in capping engagement with said containers to secure caps to said containers, and means for ejecting from said chucks any caps that were not applied to containers.

20. In a straight line capping machine, a constantly moving primary conveyer adapted to receive a line of containers successively presented thereto, means associated with said primary conveyer for accurately spacing said containers, a secondary straight line conveyer associated with said primary conveyer and adapted to accurately maintain the spacing of said containers, a plurality of capping chucks successively movable through a single orbital path including a straight portion overlying the path of travel of said containers upon said secondary conveyer, means for moving said chucks successively through said straight portion of said orbital path in synchronism with said secondary conveyer and the containers associated therewith, means for supplying container caps to said chucks, means for moving said cap carrying chucks into and out of capping engagement with said containers, means for rotating said chucks during at least the time they are maintained in capping engagement with said containers, and means for ejecting from said chucks any caps that were not applied to containers.

21. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path in synchronism with said containers, means for serially presenting container caps for engagement by said chucks, means for effecting the engagement of said caps and said chucks, means for moving said cap carrying chucks into and out of capping engagement with said containers, and means for operating each of said chucks while in capping engagement with said containers to secure caps to said containers.

22. In a straight line capping machine, means for moving in a straight line a line of containers to be capped, a plurality of capping chucks successively movable through a single orbital path including a straight portion overlying the path of travel of said containers, means for moving said chucks successively through said straight portion of said orbital path in synchronism with said containers, means for serially presenting container caps for engagement by said chucks, means for effecting the engagement of said caps and said chucks, means for moving said cap carrying chucks into and out of capping engagement with said containers, means for operating each of said chucks while in capping engagement with said containers to secure caps to said containers, and means for ejecting from said chucks any caps that were not applied to containers.

23. In a straight line capping machine, means for moving in a straight line a line of containers to be capped, a plurality of capping chucks successively movable through a single orbital path including a straight portion overlying the path of travel of said containers and including other portions out of vertical alignment with said straight portion, means for moving said chucks successively through said straight portion of said orbital path at a speed of advance equal to the speed of advance of said containers, means for moving said chucks into and out of capping engagement with said containers, and means for operating each of said chucks while in capping engagement with said containers to secure caps to said containers.

24. In a straight line capping machine, means for moving in a straight line a line of containers to be capped, a plurality of capping chucks successively movable through a single orbital path including a straight portion overlying the path of travel of said containers and including other portions out of vertical alignment with said straight portion, means for moving said chucks successively through said straight portion of said orbital path in synchronism with said containers, means for serially presenting container caps for engagement by said chucks, means operative while said chucks are moving through said other portions of said orbital path for effecting the engagement of said caps and said chucks, means for moving said cap-carrying chucks into and out of capping engagement with said containers, and means for operating each of said chucks while in capping engagement with said containers to secure caps to said containers.

HOWARD E. GANTZER.